United States Patent [19]

Magnani et al.

[11] 4,290,054

[45] Sep. 15, 1981

[54] ELECTRICAL APPARATUS AND METHOD FOR ELECTRICALLY SIMULATING A NOISE

[75] Inventors: Michel Magnani, Templeuve; Michel Moulin, Nieppe, both of France

[73] Assignee: S.A. Andre Boet, France

[21] Appl. No.: 103,063

[22] Filed: Dec. 12, 1979

Related U.S. Application Data

[63] Continuation-in-part of Ser. No. 883,844, Mar. 6, 1978.

[30] Foreign Application Priority Data

Mar. 8, 1977 [FR] France ................................ 77 07573

[51] Int. Cl.$^3$ ............................ G09B 9/02; G08B 3/10

[52] U.S. Cl. ................................ 340/384 E; 340/393

[58] Field of Search ................ 340/384 R, 384 E, 393

[56] References Cited

U.S. PATENT DOCUMENTS

| | | | |
|---|---|---|---|
| 3,893,107 | 7/1975 | Schedler | 340/384 E |
| 3,913,097 | 10/1975 | Schedler | 340/384 E |
| 3,913,245 | 10/1975 | McCanney | 340/384 E |
| 4,023,078 | 5/1977 | Olliges et al. | 340/384 E |

*Primary Examiner*—Alvin H. Waring
*Attorney, Agent, or Firm*—Robert E. Burns; Emmanuel J. Lobato; Bruce L. Adams

[57] ABSTRACT

An electrical apparatus and method for electrically simulating noise resulting from the thermodynamic expansion of a gas inside a chamber whose volume is varied, is characterized in that it comprises, in series, a capacitor of fixed capacitance and means for varying with respect to time the potential at at least one of the terminals of the capacitor, the potential variation depending on the variation of the volume with respect to time and on the nature of said expansion.

9 Claims, 8 Drawing Figures

Fig 2
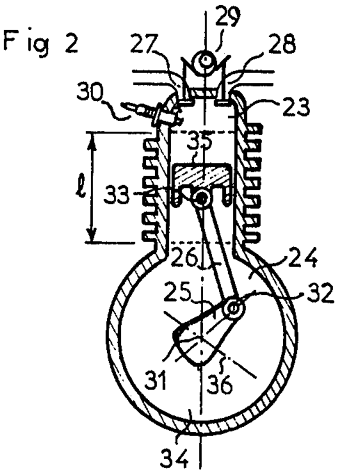
Fig5
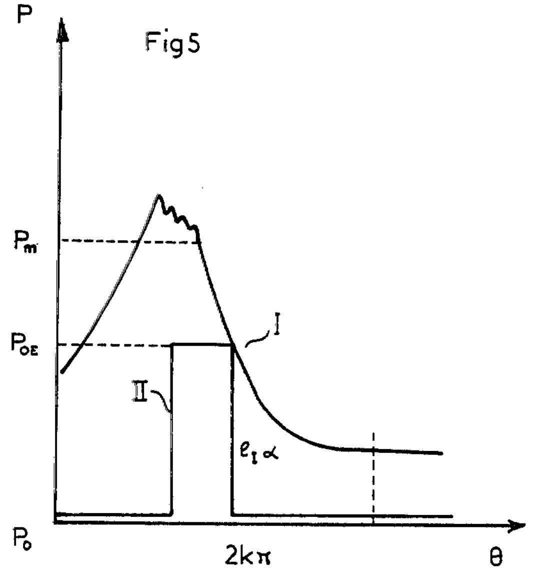
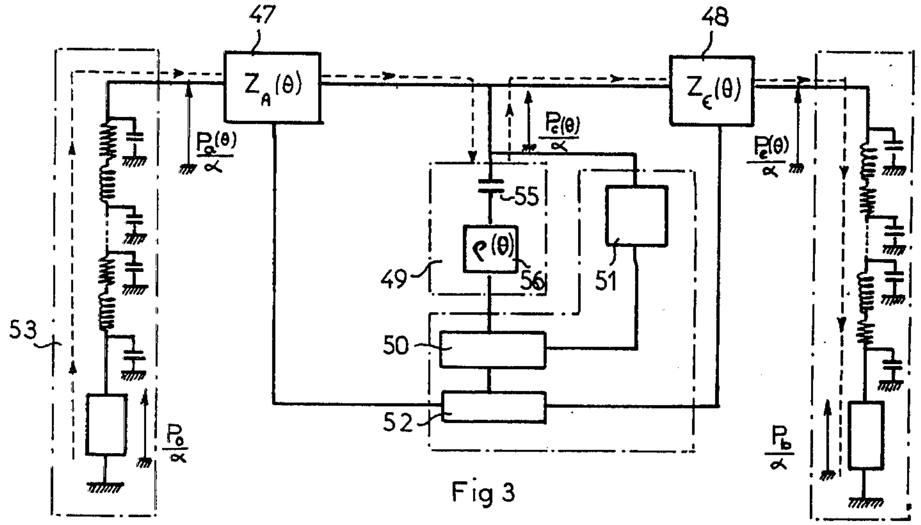
Fig 3

ELECTRICAL APPARATUS AND METHOD FOR ELECTRICALLY SIMULATING A NOISE

REFERENCE TO PRIOR APPLICATION

This application is a continuation-in-part of our application Ser. No. 883,844 filed Mar. 6, 1978.

FIELD OF INVENTION

The present invention relates to an electrical apparatus and method for electrically simulating a noise.

The invention relates more particularly, but not exclusively to the electrical simulation of noises emitted by an actual source such as an engine, an alternating or rotary compressor and more generally to the simulation of noises emitted by the thermodynamic expansion of a gas in a chamber having a variable or constant volume, with or without the flow of gas into or out of the chamber, with or without the exchange of heat or work.

The invention intends to facilitate the rapid artificial creation of a considerable number of basic sound sources in particular in order to emit an electrical signal representative of the synthetic noise of the noises emitted by these various basic sound sources.

Since any characteristic of a simulated source is similar to a characteristic of a real source, it is thus possible to simulate:

either existing real sound sources, in particular for the purpose of optimizing the choice of sound-proofing members to be used to reduce the noise emitted by these sources to the maximum, or sound sources to be created at least partially, in order to optimize these sources, for example for the purpose of reducing the noise emitted by the latter.

The similarity between the propagation of acoustic and instantaneous acoustic pressure being similar respectively to the intensity and potential or an electrical current for example.

BACKGROUND OF THE INVENTION

In the present state of the art relating to the electrical simulation of acoustic phenomena, it is known to simulate acoustic phenomena taking place in installations having a constant volume.

This volume V is thus compared with a disconnected capacitor having a capacitance C, which has been charged with a quantity Q of electricity by applying a potential difference e, itself similar to the pressure p of the gas enclosed in the volume V.

Most of the thermodynamic expansions to which the invention relates do not however take place in a constant volume and it is an object of the invention to simulate the thermodynamic expansion of a gas in a chamber having a variable volume, if necessary with flow into and/or out of the chamber.

In the case of an isothermal expansion of gas in a chamber of variable volume, but without flow, the relationship between the instantaneous volume V (t) of the chamber and the instantaneous capacitance C (t) of a variable capacitor can be maintained at all times. This may be expressed by the similarity existing between Mariotte's law:

$$P(t)\times V(t)=\text{constant}$$

and the theoretical formula which would express the constant nature of the quantity Q of electricity stored in a disconnected capacitor whose capacitance C (t) varies over a period of time, which would vary the potential difference e (t) over a period of time existing between the capacitor plates:

$$C(t)\times e(t)=Q=\text{constant.}$$

Under these conditions, an isothermal transformation could thus be simulated by the use of a variable capacitance capacitor.

However, in practical terms, such a simulation would be difficult to achieve for several reasons.

A first difficulty resides in that the simulation of cyclic phenomena due to the operation of a rotary machine such as an engine or compressor would require a speed of variation of the capacitance of the capacitor which is incompatible with currently known means for the mechanical variation of such a capacitance.

Another difficulty results from the fact that if it is possible to charge a capacitor progressively, the discharge resulting from a decrease in its capacitance for example could be violent.

Finally, the similarity between the interdependence of the pressure and volume of a gas and the interdependence between the capacitance of a disconnected capacitor and the instantaneous potential difference between its terminals is limited to the case of an isothermal expansion of the gas, without any flow of gas from the chamber containing it, which is quite inadequate for expressing all the possible expansions of the gas.

DESCRIPTION OF THE INVENTION

These various difficulties are resolved, according to the invention by comparing the chamber of closed variable volume in which a gas undergoes an isothermal, polytropic or adiabatic expansion with a capacitor of fixed capacitance at at least one of the terminals of which, the potential is varied according to a law depending both on the variation with respect to time of the volume of the chamber and on the nature of the thermodynamic expansion of the gas in the latter.

Since the mass flow of a gas in a pipe or via an orifice is similar in known manner to an electrical intensity (so-called MAXWELLS analogy,) the closure of the circuit comprising the capacitor of fixed capacitance and the means for varying the potential at at least one of the terminals of the latter on a circuit having a resistance adds the notion of flow out of or into the chamber of variable volume.

The presence of cyclic obstacles to the flow such as valves is thus simulated by a variation of the internal impedance of the circuit according to a law depending both on the inherent characteristics of the obstacle to the flow and on its operating cycle and on the nature of the flow which may be supersonic or subsonic.

To this end, one preferably uses a semi-conductor whose internal impedance develops over a period of time depending on these parameters.

The law of variation of the internal impedance of this semi-conductor over a period of time firstly takes into account the expansion of the opening section of the valve over a period of time and secondly the relationship existing between the mass flow of the gas through the obstacle and the pressure prevailing inside the chamber if the speed of flow is supersonic and also the pressure prevailing on the other side of the obstacle if the speed of flow is subsonic.

In the frequent case where there is an intake and exhaust, the circuits respectively simulating the intake or the exhaust are arranged in parallel to each other and are connected to the terminals of the arrangement formed by the capacitor and the means for varying the potential at at least one of the terminals of the capacitor. The circuit simulating the intake generally comprises, in series with the semi-conductor simulating the intake valve, a source of fixed voltage for example simulating atmospheric pressure in the case of an engine or a compressor whose intake valve opens into the atmosphere; the circuit simulating the exhaust in turn generally comprises, in series with the semi-conductor simulating the exhaust valve, a fixed impedance simulating the exhaust pipes in known manner.

It can be shown that the instantaneous intensity of the current which flows through these respective intake and exhaust circuits is at each instant similar to the instantaneous mass flow of gas respectively through the intake pipes and through the exhaust pipes.

It can also be shown that the function expressing the potential e1 at the terminals of the capacitor of fixed capacitance with respect to time, in the circuit simulating the chamber of variable volume in which the gas undergoes its thermodynamic expansion, takes the following form:

$$e1\,(t) = \frac{Po}{\alpha}\left(\frac{Vo^{\gamma}}{V^{\gamma}(t)} - 1\right)$$

in which Po designates the pressure prevailing initially in the chamber, $\alpha$ is a constant compensation factor able to be determined by a man skilled in the art, Vo is the initial volume of the chamber. V(t) is the function expressing the volume of the chamber over a period of time and $\gamma$ is the ratio of the specific heat at a constant pressure Cp of the gas to the specific heat of the gas with a constant volume Cv.

This function, which takes into account the variation in the volume of the chamber with respect to time, represents the variation of pressure prevailing in the chamber depending on the expansion of the volume of the chamber, i.e. on the nature of the transformation which the gas undergoes in the chamber.

By an appropriate choice of the means creating and varying the potential e1 over a period of time, since the design of the corresponding circuit and the choice of the components are within the scope of a man skilled in the art, it is thus possible to effectively represent any desired thermodynamic expansion by electrical phenomena.

In the particular case of an engine the injection and combustion of the fuel mixture in the cylinder also affects the emission of noise.

This injection and combustion are translated by an increase in the mass and instantaneous pressure in the cylinder, from the time when they take place until the time when exhausting occurs.

Since the mass and pressure are respectively simulated by a quantity of electricity and a potential difference, by electrical simulation of acoustic phenomena, the injection and combustion of the fuel mixture are translated by the supply of a quantity of electricity and a potential difference at the terminals of the arrangement formed by the capacitor and the means for varying the potential at at least one of the terminals of the capacitor. At any instant, this supplied potential difference should be equivalent to the resulting increase in pressure at the considered instant of the combustion of the fuel mixture.

However, to the extent that the phenomenon of the emission of a noise due to the thermodynamic expansion of a gas takes place only when one of the valves is open, only the following are of importance: the increase in pressure resulting from the injection and combustion and more generally, the thermodynamic state of the gas in the chamber, at the time of opening a valve and its expansion until the closure of the latter.

The value of the potential to be supplied as a consequence, between these two instants, in order to simulate this increase in pressure, can be easily measured by a man skilled in the art, who may also determine the corresponding circuits.

initiation of the simulated operations: injection-combustion opening and closing of the intake and exhaust valves, are synchronized and controlled by a time base of the simulated source.

Since the opening and closing of the valves of an engine are controlled by a cam shaft, itself moved by a crankshaft, whose operating cycle in turn determines the cycle of variation of the volume in each cylinder and the phase difference between the various possible cylinders, this time base is provided by a circuit simulating the cycle of rotation of the crankshaft, controlling a circuit simulating the rotation of the cam shaft and the positions at each instant of the various intake and exhaust cams.

BRIEF DESCRIPTION OF DRAWINGS

The invention will now be described by way of example with reference to the attached drawings in which:

FIG. 2 is a diagrammatic view of a single cylinder engine capable of being simulated according to the invention, in cross section on a plance perpendicular to the axis of the crankshaft of the engine and including the axis of the combustion chamber of the engine;

FIG. 3 is a circuit diagram for simulating the engine shown in FIG. 2;

FIG. 5 is a graph showing the development of pressure within the cylinder on rotation of the crankshaft of the engine shown in FIG. 2 including the injection and combustion or explosion of fuel in the cylinder and the rectangular signal of voltage injected at the output of the circuit simulating the cylinder at the moment of opening of the exhaust in order to simulate the pressure prevailing within the cylinder at this instant;

DESCRIPTION OF PREFERRED EMBODIMENT

Figure 1:
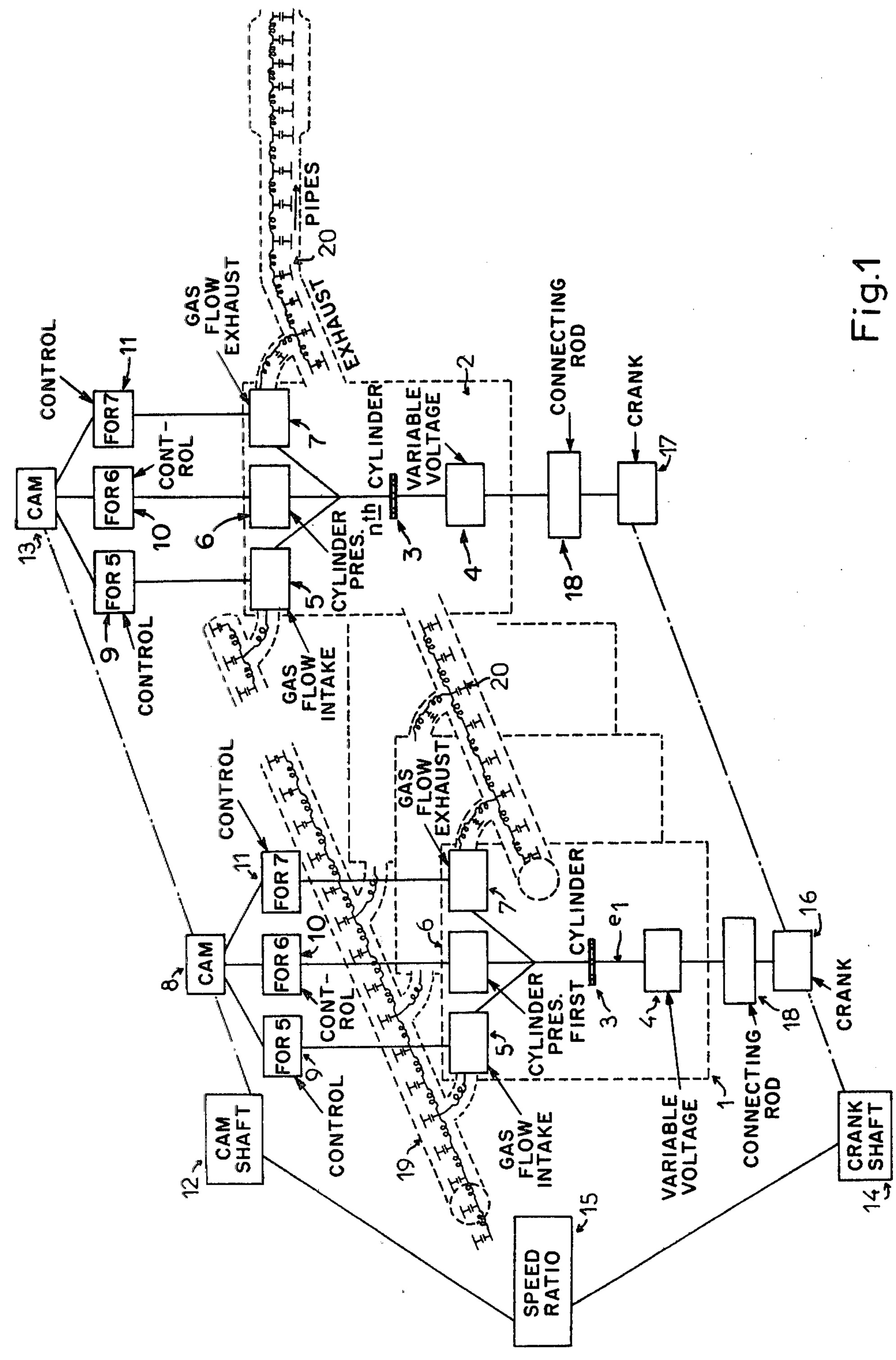
FIG. 1 shows in a general manner a circuit for simulating an engine having N cylinders.

The diagram of FIG. 1 shows in a general manner the case of an engine having N cylinders, only the first and the N-th cylinder 2 being shown diagrammatically, taking into account the fact that the different cylinders are simulated in an identical manner if they are themselves identical.

If reference is made more particularly to the first cylinder reference numerals 3 and 4 identify circuit elements simulating the thermodynamic expansion of a gaseous mixture inside the cylinder during variations in the volume of the cylinder, it being assumed that there is no gas intake, injection of fuel mixture, or gas exhaust. The reference numeral 3 identifies a fixed capacitor and the reference numeral 4 identifies a circuit varying the voltage e1 (t) with respect to time at one of the terminals of the capacitor 3 in order to simulate the evolution of the pressure of the gaseous mixture in the cylinder depending on the expansion of the volume of the cylinder, i.e. in order to simulate the function:

$$P(t)=F(V(t)) \text{ with } pV^{\gamma}=cte.$$

Reference numerals 5, 6, 7 identify three parallel circuits respectively simulating gas flow via the intake valve, pressure increase inside the combustion chamber due to fuel injection and combustion of the fuel mixture, and the flow of gas via the exhaust valve.

The circuits 5, 6 and 7 are controlled by a circuit 8 simulating the rotation of the cams of the cylinder in question. For example, in the case of the first cylinder, circuit 8 controls a circuit 9 to limit the operation of the circuit 5 to periods between the instant of opening and the instant of closing of the intake valve, a circuit 10 to operate circuit 6 only at times corresponding to the actual fuel injection period and combustion period just before the opening of the exhaust valve, and a circuit 11 to limit the operation of circuit 7 to periods between the opening instant of the exhaust valve and the instant of its closure.

It should be noted that the effect of the circuits 5, 6, 7 is only significant when they are caused to operate respectively by circuits 9, 10 and 11 respectively, the circuits 9, 10 and 11 themselves being controlled by the circuit 8. This facilitates the choice of components for the circuits 5, 6 and 7 which have no effect between their periods of operation.

The circuit 8 which simulates the rotation of the cams corresponding to the first cylinder 1 is controlled by a circuit 12 simulating the rotation of the cam shaft. The circuit 12 also controls the circuits simulating the rotation of the cams corresponding to the other cylinders and for example the circuit 13 simulating the rotation of the cams corresponding to the nth cylinder 2. The circuits such as 8 and 13 in fact establish the phase difference between the intake, injection and exhaust of the various cylinders, taking into account the angular stagger of the cams corresponding to these various cylinders on the cam shaft.

The circuit 12 simulating the rotation of the cam shaft is controlled simultaneously by a circuit 14 simulating the rotation of the crank shaft, an electronic circuit 15 establishing the ratio of the speeds of rotation of the cam shaft 12 and of the crank shaft 14 depending on the engine cycle. The speed of rotation of the cam shaft is in fact half of that of the crankshaft for a four-stroke engine, whereas it is identical to that of the crankshaft for a two-stroke engine.

The circuit 14 for simulating the rotation of the crankshaft in turn controls the circuits simulating the rotation of the cranks corresponding to the various cylinders and establishing the phase difference between these cranks. The circuit 16 has been shown for example simulating the rotation of the crank corresponding to the first cylinder 1 and a circuit 17 simulates the rotation of the crank corresponding to the nth cylinder 2.

Each cylinder is associated with identical circuitry. Taking the circuitry associated with cylinder 1 as an example, the circuit 16 is connected to the circuit 4 for varying the potential at one of the terminals of the capacitor 3 as a function of the variation of the internal volume of the corresponding cylinder and the corresponding variation in the pressure of the gas inside the cylinder by means of a circuit 18 simulating the kinematics of the connecting rod, i.e. translating the transformation of the rotary movement of the crank into a reciprocating movement of the piston inside the cylinder. The circuit 18 may also take into account possible eccentricity of the connecting rod.

Naturally, circuits similar to the circuits which have been described with reference to the cylinder 1 are provided for simulating each of the other cylinders.

For cylinder 1, the circuit 4 simulates the development over a period of time of the pressure of the gas in the cylinder-volume of the cylinder depending on the nature of the thermodynamic expansion to which the gas is subjected in the cylinder. The pair of circuits 5, 9 simulates the variation over a period of time of the opening of the intake valve of the cylinder 1. The effect of the supersonic or subsonic speeds of flow is allowed for by varying the internal impedance of the circuit 5 over a period of time according to a law which can be determined by a man skilled in the art. The circuit 6 provides a potential simulating the increase in pressure in the cylinder due to a fuel injection and to the combustion of the fuel mixture, the circuit 6 being operated by circuit 10 at the instant when the corresponding pressure increase result in the emission of a noise. Similarly, the circuit 7 introduces the effect of the variation in the opening of the exhaust valve as a function of time and simulates the mass flow of the gas through this valve, the speed of flow being allowed for by varying the internal impedance of circuit 7 according to a law predetermined by a man skilled in the art between the instants controlled by the circuit 11.

The circuit 5 simulating the phenomena taking place in the region of the intake valve of the first cylinder 1 is connected to similar circuits corresponding to the other cylinders by a transmission line 19, simulating the intake pipes. A transmission line 20 simulates the exhaust pipes interconnecting the circuits similar to the circuit 7 of the various cylinders. The transmission lines provide a predetermined impedance distributed uniformly along their lengths as schematically indicated in the drawing.

These lines 19 and 20 can be selected by a man skilled in the art to correctly simulate the flow through the intake and exhaust pipes.

Although the invention has been illustrated on the example of an engine, its application is in no way limited to the simulation of such a source of noises, but is also applicable to other cases such as alternating or rotary compressors.

In the case of an alternating compressor, there is naturally no injection of fuel mixture and the opening and closing of the intake and exhaust valves are not controlled by the cams of a cam shaft, but by the variation of pressure prevailing on either side of the valve. A man skilled in the art will make the corresponding modifications easily.

Noises other than those which are due to the thermodynamic expansion of the gas in these various devices may be easily simulated, in manner known per se, or determined experimentally then reproduced by a signal of the same type as the analog signals obtained by the circuits described above. The invention makes it possible to simulate any alternating machine conveying compressible fluids and more generally any thermodynamic expansion of a gas in a chamber of variable or constant volume, with or without a flow towards the inside or outside of this chamber, in particular by an appropriate choice of the laws of variation of the potential at the terminals of the fixed capacitance and the respective laws of variation of the internal impedances of the semiconducting circuits such as 5 and 7 respectively simulating the intake valve and exhaust valve, if it is necessary to provide such valves.

The construction of the corresponding circuits and the choice of their components are within the scope of a man skilled in the art, who will also determine the various laws of variation of the magnitudes in the simulation circuits depending on the laws of variation of actual magnitudes.

The law of variation of the potential at the terminals of the capacitance such as 3 will be different from the law chosen for example, corresponding to the case of an adiabatic expansion of gas in the chamber, if this expansion is polytropic or isothermal.

The volume of the chamber may vary in a cyclic manner, or periodic or sinusoidal manner for example.

In the case of cyclic isothermal expansion, the law of variation of the potential at the terminals of the capacitance will be inversely proportional to the variation of the volume V(t).

Turning now to FIGS. 2 to 8 which show an example of the invention in the case of the single cylinder engine shown diagrammatically in FIG. 2.

The engine shown in FIG. 2 comprises the single cylinder in which a piston 22 is linearly reciprocable, a combustion chamber 23 being defined by the piston 22 and the cylinder 21 within the latter. A crankshaft 25 is situated within a housing 24 and a connecting rod 26 joins a crank pin of the crankshaft 25 to the piston 22. A valve 27 for inlet of fuel mixture into the combustion chamber 23 and an exhaust valve 28 for the egress of spent gases out of the combustion chamber 23 are provided. The cam shaft 25 actuates these two valves 27 and 28 on opening and closing, as a function of the instantaneous position of the crank shaft 25. A spark plug 30 is also provided. The axis of rotation of the crankshaft 25 within the housing 24, the axis of hinging of the connecting rod 26 on the crank pin of the crankshaft, and the axis of hinging of the connecting rod on the piston are designated by the references 31 to 33 respectively, these three axes being parallel and the planes 34 defined by the axes 31 and 33 fixed in relation to the engine. The travel of the piston 22 is designated by l, that is the distance measured in the plane 34 perpendicular to the axes 31 and 33, separating the extreme positions of its face 35 which defines with the internal face of the cylinder 21 the combustion chamber 23, and by $\theta$ the angular instantaneous position of the plane defined by the axes 31 and 32, in relation to a plane 36 defined by the position occupied by this plane which is defined by the axes 31 and 32 at the moment of opening of the exhaust value 28, taking into account the integral rotation of the camshaft 29 and of the crankshaft 25, which drives it at the same speed of rotation in the case of a two stroke engine and at a half speed in the case of a four stroke engine. The direction of rotation of the crankshaft 25, shown diagrammatically by an arrow, gives the direction of the positive $\theta$.

The engine has been represented in a phase which immediately follows the opening of the exhaust valve 28.

A simulation of the cylinder of this engine can be achieved by the circuit illustrated in FIG. 3 and consists of a set of electronic circuits simulating:

the inlet valve 27 and the exhaust valve 28 (circuits 47 and 48 respectively);

the cylinder as such, or more accurately the combustion chamber 23 (circuit 49 controlled kinematically by a circuit 50 which is analogous to the crankshaft 25 and in a thermodynamic manner by a circuit 51 which represents the initial conditions of the gas in the combustion chamber at the moment of opening of the exhaust valve 28); and the analogue circuit 50 of the crankshaft controlling an analogue circuit 52 of the camshaft 29 which controls the progressive opening of the valves 27 and 28 according to the profile of the cams.

These circuits will be described in detail below.

An electric current analogous to the discharge of the instantaneous inlet mass $Q_{na}$ is generated during the opening of the inlet valve 27 and travels from circuit 47 towards circuit 49. This current brings about an instantaneous voltage downstream of of the circuit 47 taking into account the direction of travelling above, which voltage is analogous to the pressure $P_a$ which represents the noise at the origin of the inlet.

Similarly, an electric current analogous to the discharge of the instantaneous mass of exhaust $q_{ne}$ is generated during the opening of the exhaust valve 28 and travels from circuit 49 towards circuit 48 and beyond. This current brings about an instantaneous voltage upstream of the circuit 48, which voltage is analogous to the pressure $P_e$ which represents the noise at the origin of the exhaust at the level of the pipe of the exhaust collector of the cylinder.

The inlet and exhaust pipework of the cylinder are not shown in FIG. 2, but a circuit for simulating this is shown in FIG. 3. Circuits 53 and 54 respectively, upstream of the circuit 47 and downstream of the circuit 48 respectively, taking into account the directions of electrical current indicated above, simulate the inlet and exhaust pipework. The circuit 53 includes immediately upstream of the circuit 47 a line with a distributed constant simulating the inlet pipework and the carburettor and, upstream of this line with distributed constant a source of voltage $P_o/\alpha$, where $P_o$ designates the atmospheric pressure and $\alpha$ designates a coefficient of similarity of pressures in order to simulate the sampling of the fuel mixture at atmospheric pressure in the carburettor. Similarly, the circuit 54 includes, immediately downstream of the circuit 48, a line with a distributed constant simulating the exhaust pipework and joining this circuit 48 to a voltage source $P_b/\alpha$, where $P_b$ designates the mouth pressure or the pressure at the outlet of the exhaust pipe, which may be different from the atmospheric pressure and variable as a function of time when the engine forms part of the equipment of a vehicle which generates turbulences which vary notably with speed, in order to simulate the escape of gases into the atmosphere after they have passed through the exhaust pipework.

Figure 4:
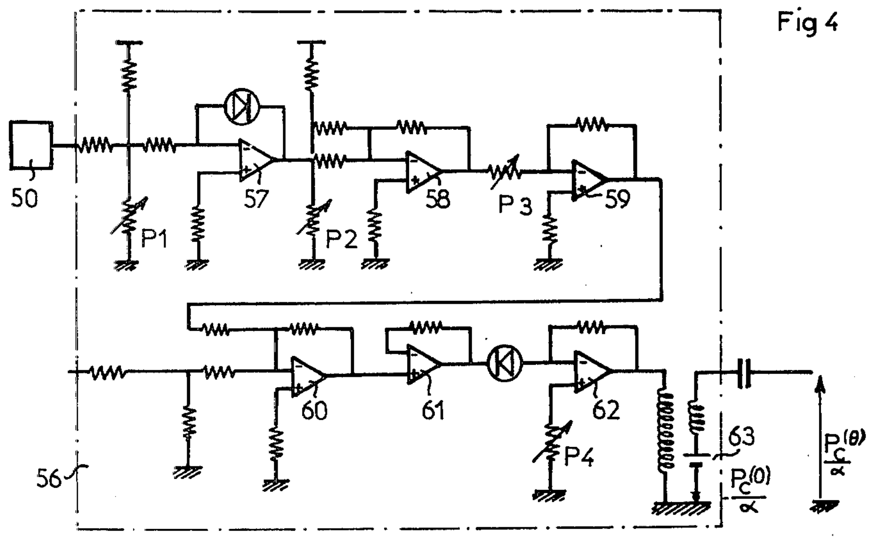
FIG. 4 is an electronic analogue circuit diagram for simulating the cylinder of the engine shown in FIG. 2.

FIG. 4 shows in detail the circuit 49, which simulates the cylinder, or more accurately, the combustion chamber 23, taking into account the fact that, for a polytropic development, the pressure in the combustion chamber $P_c(\theta)$ is connected to the instantaneous volume of this combustion chamber $V(\theta)$, for an angular position of the crankshaft designated by the angle $\theta$ defined above, by the expression:

$$P_c(\theta) = P_c(o)\left[\left(\frac{V(o)}{V(\theta)}\right)^{\gamma} - 1\right] + \frac{a^2(o) \cdot m(o)}{\gamma V(o)}$$

where $$V(\theta) = \frac{V_e}{2}[1 + \cos(\theta)] + \epsilon$$

if the obliqueness of the connecting rod is disregarded.

In these expressions, $P_c(o)$ designates the pressure on opening of the exhaust valve, a(o) and m(o) designate the speed of sound and the volume of gas at the openin of the exhaust valve respectively, V(o) the volume of the combustion chamber at the moment of this opening, $\gamma$ represents a coefficient of polytropic evolution of the gases, $V_e$ the volume produced in the cylinder by the piston, that is, the product of the travel l of the piston through the bore of the cylinder and $\epsilon$ the residual volume of the combustion chamber at the high dead point, that is, the minimum volume of this chamber.

In accordance with the invention, the second term of the first expression, independently of $\theta$, is represented by a capacitor 55 of fixed capacitance $C_m$ such as $$Cm = \frac{\sigma V(o)}{a^2(o)}$$

where $\sigma$ is the coefficient of analog conversion of the volume.

The first term of the first expression, which is variable as a function of $\theta$, consists of a generator of voltage 56 which is liable to emit, in series with the capacitor 55, a voltage:

$$e(\theta) = \frac{P_c(o)}{\alpha}\left[\left(\frac{V(o)}{V(\theta)}\right)^{\gamma} - 1\right]$$

In a similar manner, this expression is set out in the form:

$$e(\theta) = \frac{P_c(o)}{\alpha} \exp. \{\gamma\ [\mathrm{Log}_e V(O) - \mathrm{Log}_e V(o)]\} - \frac{P_c(o)}{\alpha}$$

If we refer to FIG. 4, it is seen that the corresponding electronic circuit 56, which receives the output signal of the circuit 50 which is the analog of the cranshaft, includes an operational circuit 57 which makes it possible to generate $\mathrm{Log}_e V(\theta)$, the potentiometer $P_1$ standardising the amplitude of $V(\theta)$, an operational circuit 58 carrying out the operation of addition $\mathrm{Log}_e V(\theta) - \mathrm{Log}_e V(o)$, the potentiometer $P_2$ which makes it possible to standardise the amplitude of V(o), an operational circuit 59 making it possible to calculate the expression:

$$\gamma[\mathrm{Log}_e V(\theta) - \mathrm{Log}_e V(O)]$$

the potentiometer $P_3$ making it possible to regulate the value of the polytropic coefficient $\gamma$, and circuits 60 and 61 making it possible to adapt the dynamics of the signals and to adapt the impedence of a circuit 62, respectively, which itself carries out the operation:

$$\frac{P_c(o)}{\alpha} \exp\{\gamma\ [\mathrm{Log}_e V(\theta) - \mathrm{Log}_e V(O)]\}$$

the potentiometer $P_4$ regulating the amplitude of $P_c(o)/\alpha$

A transformer T whose primary circuit receives the signals which are issued from a circuit 62 and whose secondary circuit is in series with the capacitor 55 makes it possible to obtain a very slight impedence in series with the capacitor; a generator of continuous voltage 63, in series with the secondary circuit of the transformer T and with the capacitor 55, generates the difference $-P_c(o)/\alpha$.

The circuits described in the reference to FIG. 4 express the thermodynamic development of the gases within the combustion chamber by compression and expansion, but they do not represent the effect of the explosion or of the combustion of these gases.

This combustion or explosion is of importance with regard to the noise only at the moment of opening of the exhaust valve 28, and owing to this is not simulated; its influence is introduced by a device which will be described by referring to FIG. 5.

FIG. 5 shows at I the curve of actual development of the pressure of the gases in the combustion chamber taking into account the combustion which takes place in the zone of the curve indicated by the arrow, and at II the signal emitted by the circuit 51 in order to simulate the pressure conditions in the chamber at the moment of opening of the exhaust valve in order to express their influence on the noise at the exhaust. The angles $\theta$ are plotted along the abscissa and the pressures (curve 1) and voltage (in the case of curve 2, taking into account the coefficient $\alpha$) are plotted along the ordinate.

It is seen that the initial pressure conditions, at the moment of opening of the exhaust corresponding to an angle $\theta$ which is zero (mod 2 $\pi$) are simulated by the injection, between the circuit 55 and the circuit 48, of a rectangular voltage signal whose amplitude $e_I$ is analogous to the pressure $P_{OE}$ which prevails in the combustion chamber at the moment of opening of the exhaust valves. This voltage, which is otherwise zero, is injected at an instant which immediately precedes the instant of the opening of the exhaust valve, up to this moment.

The voltage $e_I$ is adjusted to the value:

$$e_I = \frac{P_m}{\alpha}\left(\frac{V_1}{V(o)}\right)^{\gamma_p}$$

with Pm the pressure in the cylinder at the moment of combustion or explosion, when the cylinder admits a volume $V_1$, and $\gamma_p$ the coefficient of polytropic expansion.

The value of $V_1$ is a specified characteristic of the engine being simulated and the value of Pm can be measured or deduced by calculation of other measured magnitudes.

The voltage $e_I$ is injected between the appropriate instants, determined as a function of the angle $\theta$ taking into account the the nature of the engine, two stroke or four stroke, and the shape of the cam shaft, by a commercial voltage generator, of which it will be seen later that it can group the circuits 50, 51, 52.

Figure 6:
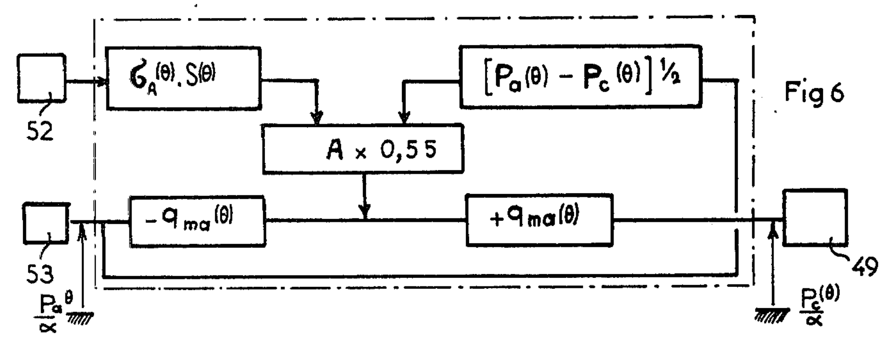
FIG. 6 is a diagram of a looped circuit equivalent to the isomorphous impedance of an inlet valve of the engine shown in FIG. 2.
Figure 8:
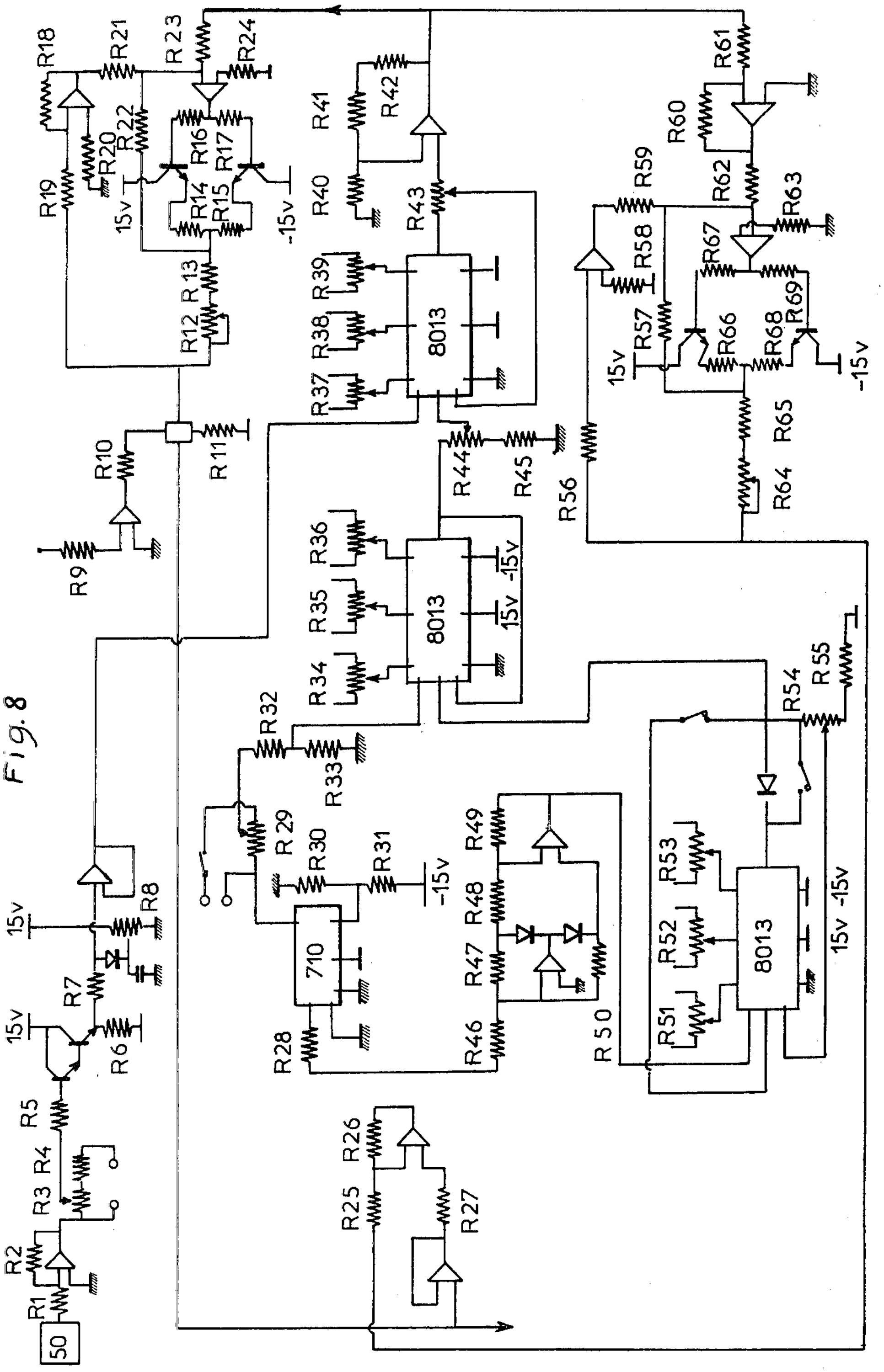

The analog circuits 47 and 48 of the inlet valve and of the exhaust valve respectively present the same structure and only the circuit 47 is to be described at present, shown in reference in FIGS. 6 and 8.

The instantaneous mass discharge at the level of the inlet valve $a_{ma}(\theta)$, which is zero when this valve is closed, is a nonlinear function of the pressures $P_a(\theta)$ and $P_c(\theta)$ upstream and downstream of the valve respectively.

In a subsonic system, a simplified expression is used:

$$q_{ma}(\theta)=A \quad A^{(\theta)}S_A(\theta)\,[P_a(\theta)-P_c(\theta)]^{\frac{1}{2}}\times 0.55$$

The constant 0.55 is a term of deviation in relation to the exact formula.

A is a constant which depends on the thermodynamic conditions of the gas in the cylinder and can be determined by the specialist by experiments and calculations.

$\sigma_A(\theta)$ $S_a(\theta)$ is the section of contracted opening of the interstitial orifice of the inlet valve as a function of the profile of the corresponding cam of the cam shaft, where $S_a(\theta)$ is the actual opening cross section of this valve and $\sigma_a(\theta)$ is a constraction coefficient; these variables can be evaluated in a manner which is known to a person skilled in the art.

As the discharge depends on the difference between the pressures which prevail upstream and downstream of the valve $P_a(\theta)$ and $P_c(\theta)$ respectively, but since these pressures depend on the discharge for a given angle $\theta$, that is at a given instant, the expression above can be represented in the form of the looped circuit illustrated in FIG. 6. The whole of this circuit is equivalent to the isomorphous impedance $Z_A(\theta)$ of the inlet valve, taking into account the fact that this impedance is defined by the instantaneous ratio:

$$Z_A(\theta) = \frac{P_a(\theta) - P_c(\theta)}{q_{ma}(\theta)}$$

Figure 7:
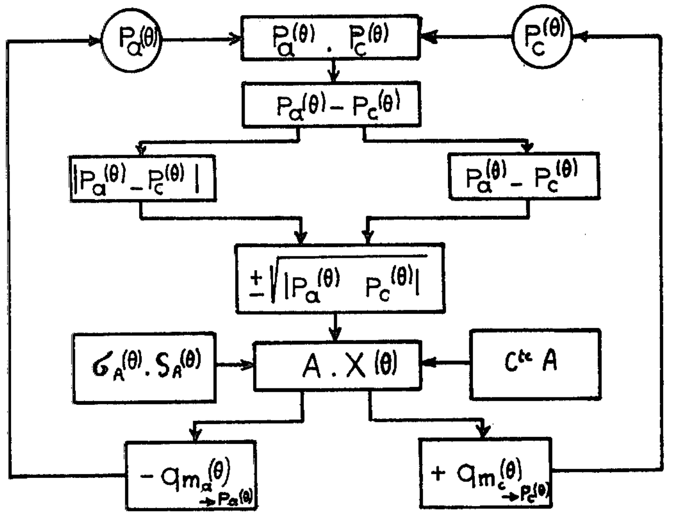
FIGS. 7 and 8 show respectively the corresponding logic circuit and electronic circuit of the engine shown in FIG. 2.

FIG. 7 represents the logic circuit and FIG. 5 represents the corresponding electronic circuit.

It can be ascertained that the discharge $q_{ma}(\theta)$ is cancelled on the one hand when the contracted section of opening of the valve $\sigma_a(\theta)$ $S_A(\theta)$ is cancelled, and on the other hand when the pressures $P_a(\theta)$ and $P_c(\theta)$ upstream and downstream of the valve respectively are equal.

Similarly the instantaneous mass discharge $q_{me}$ at the level of the exhaust valve is a nonlinear function of the pressures $P_c(\theta)$ and $Pe_e(\theta)$ respectively upstream and downstream of this exhaust valve respectively and, in the subsonic system, the following simplified expression is used:

$$q_{me}(\theta)=B\sigma_E(\theta)S_E(\theta)[P_c(\theta)=P_e(\theta)]^{\frac{1}{2}}\times 0.55$$

where B is a constant which depends on the thermodynamic conditions of the gas in the cylinder and $\sigma_E(\theta)$ $S_E(\theta)$ is the contracted opening cross section of the interstitial orifice of the exhaust valve as a function of the profile of the corresponding cam of the camshaft. The valve of B and the development of $\sigma_E(\theta)$ $S_E(\theta)$ can be determined by a person skilled in the art.

Like the expression of the instantaneous mass discharge through the inlet valve this expression can be represented in the form of a looped circuit which is similar to that of FIG. 6, where $\sigma_a(\theta)$, $S_A(\theta)$, A, $P_a(\theta)$, $P_c(\theta)$, $q_{ma}(\theta)$ and $Z_A(\theta)$ are replaced respectively by $\sigma_E(\theta)$, $S_E(\theta)$, B, $P_c(\theta)$, $P_e(\theta)$, $q_{me}(\theta)$ and $Z_E(\theta)$. This circuit, which is equivalent to the isomorphous impedance of the exhaust valve $Z_E(\theta)$, would be interpolated between the circuit 49, in upstream direction of the circuit 54, downstream, as the circuit equivalent to $Z_A(\theta)$ of FIG. 6 is interpolated between the circuit 53 in upstream direction and the circuit 49, in downstream direction.

Similarly, the corresponding logic and electronic circuits respectively could be deduced from the circuits shown in FIG. 7 and FIG. 8 respectively.

The whole of the circuits 47,48,49 and 51 which have just been described, which constitute the analogue of the engine as such, is synchronised by the analogue circuit 50 of the crankshaft, and by the analogue 52 of the camshaft.

The circuit 50 is a generator of sinusoidal voltage whose frequency F is equal to speed of rotation of the engine $\omega$ at a simulation constant close to $\gamma$:

$$F=\omega/\gamma$$

This voltage synchronises both the analogue of the cylinder 49, the circuit 51, and the analogue of the camshaft 52 which itself synchronises the analogue of the inlet valve 47 and the analogue of the exhaust valve 48.

The analogue of the camshaft 52 consists basically of a divider of frequency by two for a four stroke motor, taking into account that the speed of rotation of the camshaft in this case is half that of the crankshaft, and of a gate signal which limits the opening of the valve. It does not include frequency dividers in the case of a two stroke engine, since the camshaft and the crankshaft rotate at the same speed in this case.

These circuits are controlled by the sinusoidal signal which issues from the voltage generator 50.

In the case of an engine with several cylinders, the analogue of the crankshaft 50 here, delivers as many sinusoidal signals as cylinders with a relative phase corresponding to the distribution of the engine. Each cylinder, with its valves, is simulated by a set of circuits such as the set 49-51-52-47-48 which are supplied by the corresponding sinusoidal signal which is issued from the common circuit 50.

The circuits 50, 51, 52 even in the case of an engine with several cylinders are advantageously grouped in a same sinusoidal generator of sinusoidal voltage (supplying the circuits 50 and 52) deliver equally rectangular voltages which are variable in phase, width, and amplitude, which make it possible to obtain the signal illustrated by curve II of FIG. 5 (in order to supply the circuit 51). For example, the function generator produced by the firm SCHLUMBERGER under the reference number C R C 44-22 can be used and other equipment offering similar possibilities can naturally likewise be used.

Utilisation of the simulated engine which has been described, or other thermal machines simulated in a similar manner, is based on the measurement of the voltage and current especially upstream of the circuit 47 and downstream of the circuit 48, immediately or beyond the circuits 53 and 54 respectively. Taking into account the fact that the voltage and value of the current in the circuit at a considered point are representative of the pressure and the mass discharge of the gases respectively at the same point of the actual machine, that is, of the noise which is liable to be emitted at this point owing to the thermodynamic transformation to which the gases may be subjected there.

These measurements can be used for various purposes.

For example, when the whole of the characteristics of an engine are known, especially with an existing engine, whence it is possible to deduce the characteristics of the circuits 47 to 52, it is possible by using tests to determine what circuits 53 and 54, and consequently what characteristics of inlet and exhaust circuits, make it possible to reduce the noise emitted by the existing motor to the maximum.

When an engine which is to be made is simulated, it is possible to establish in the first place an analogue circuit whose characteristics can be varied until upstream of the analogue circuit of the inlet valve and downstream of the analog circuit of the exhaust valve or upstream of the analog circuit of the inlet valve in relation to the analogue circuit of the inlet valve and downstream of the analogue circuit of the exhaust circuit in relation to the analogue circuit of the exhaust valve. Values of corresponding current and voltage are obtained in the investigated engine, at mass discharges and pressures which result in a minimum of noise. The actual engine is then designed and achieved in relation to the characteristics which are then shown by the different analog circuits.

Partial simulations are also possible, for example, simulating the shape to give to the valves of a manufactured engine in order to minimise the noise emitted by the engine.

What is claimed is:

1. Electrical apparatus for simulating noise resulting from the thermodynamic expansion of a gas inside a chamber the volume of which is varied and from the flow of gas between the chamber and the exterior thereof, comprising a circuit for simulating the said expansion, said circuit comprising in series a capacitor of fixed capacitance and means for varying with respect to time the potential at at least one of the terminals of said capacitor, said variation of potential depending on the variation of the volume of said chamber with respect to time and on the nature of said expansion, and further comprising an exhaust circuit connected to said expansion simulating circuit, said exhaust circuit comprising in series a fixed impedance and a semi-conducting circuit, said semi-conducting circuit comprising means for varying its internal impedance with respect to time, said variation in internal impedance depending on the variation with respect to time of the mass flow of gas and of the type of flow.

2. Electrical apparatus for simulating noise resulting from the thermodynamic expansion of a gas inside a chamber the volume of which is varied and from the flow of the gas between the exterior of the chamber and the interior thereof, comprising a circuit for simulating said expansion said circuit comprising in series a capacitor of fixed capacitance and means for varying with respect to time the potential at at least one of the terminals of said capacitor, said variation of potential depending on the variation of the volume of said chamber with respect to time and on the nature of said expansion, and further comprising an intake circuit connected to said expansion simulating circuit, said intake circuit comprising in series a source of fixed voltage and a semi-conducting circuit, said semi-conducting circuit comprising means for varying its internal impedance with respect to time, said variation in internal impedance depending on the variation with respect to time of the mass flow of gas and of the type of flow.

3. Electrical apparatus according to claim 1, further comprising an intake circuit connected to said expansion simulating circuit, said intake circuit comprising in series a source of fixed voltage and a semi-conducting circuit, said semi-conducting circuit comprising means for varying its internal impedance with respect to time, said variation in internal impedance depending on the variation with respect to time of the mass flow of gas and of the type of flow.

4. Electrical apparatus according to claim 3, wherein said intake circuit and said exhaust circuit are connected in parallel to said expansion simulating circuit.

5. Electrical apparatus according to claim 3, comprising means for simulating the injection and combustion of a fuel mixture in said chamber, said injection and combustion simulating means comprising a source of voltage connected to said expansion simulating circuit in order to provide a voltage representative of the increase in pressure due to said injection and combustion of said fuel mixture.

6. Electrical apparatus according to claim 5, wherein said intake circuit, said exhaust circuit and said source of voltage simulating the injection and combustion of the fuel mixture are connected in parallel to said expansion simulating circuit.

7. Electrical apparatus according to claim 1, comprising means for operating said exhaust circuit only during periods of flow out of said chamber.

8. Electrical apparatus according to claim 2, comprising means for operating said intake circuit only during periods of flow into said chamber.

9. Electrical apparatus according to claim 5, comprising means for operating said exhaust circuit, said intake circuit and said injection and combustion simulating circuit only during periods of flow into and out of said chamber.

* * * * *